Oct. 12, 1954  W. R. L. TORRANCE  2,691,546
COLLAPSIBLE TRAILER AND LIKE VEHICLE
Filed Dec. 14, 1951  2 Sheets-Sheet 1

INVENTOR
WILLIAM ROBERT LINCOLN TORRANCE
By Haseltine, Lake & Co.
AGENTS

Oct. 12, 1954  W. R. L. TORRANCE  2,691,546
COLLAPSIBLE TRAILER AND LIKE VEHICLE
Filed Dec. 14, 1951  2 Sheets-Sheet 2
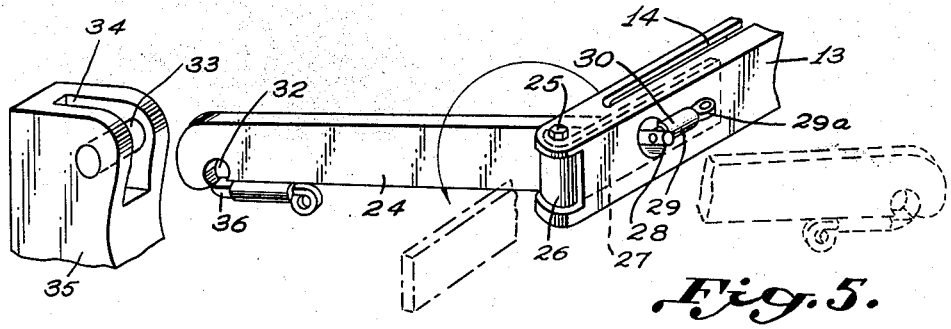
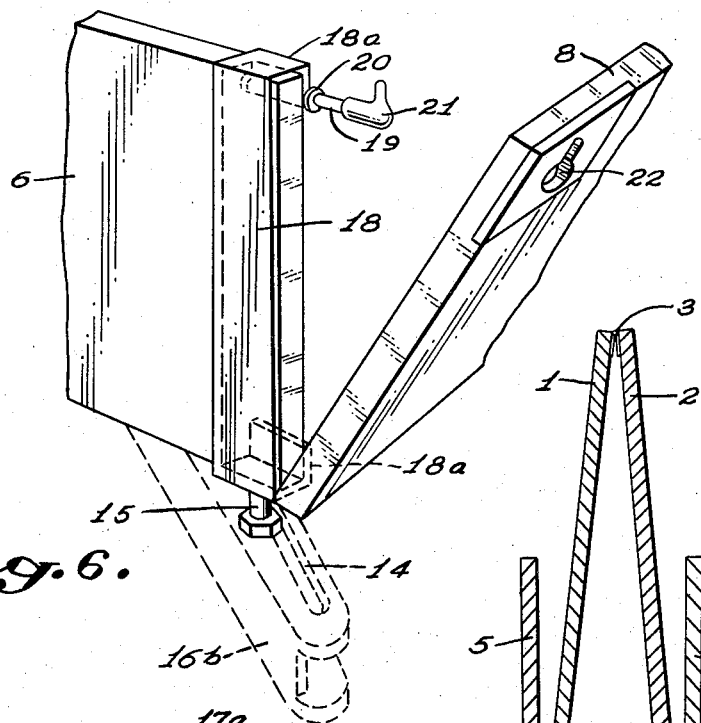
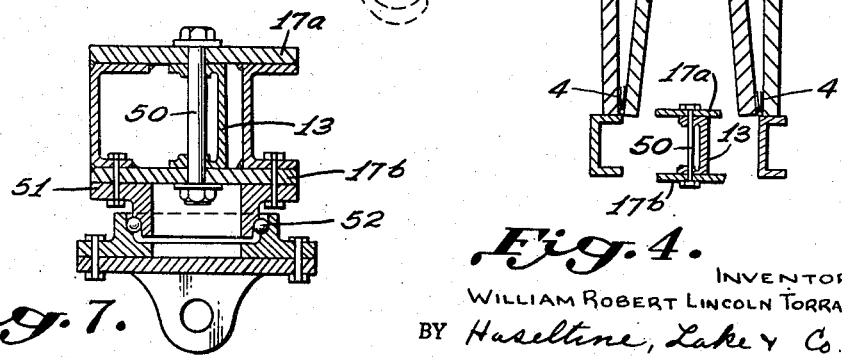
INVENTOR
WILLIAM ROBERT LINCOLN TORRANCE
BY Haseltine, Lake & Co.
AGENTS

Patented Oct. 12, 1954

2,691,546

UNITED STATES PATENT OFFICE 2,691,546

COLLAPSIBLE TRAILER AND LIKE VEHICLE

William Robert Lincoln Torrance, Vancouver, British Columbia, Canada

Application December 14, 1951, Serial No. 261,641

Claims priority, application Great Britain December 18, 1950

3 Claims. (Cl. 296—27)

This invention relates to collapsible trailers and like vehicles, e. g. hand trucks, and has for its object to provide a simple and sturdy form of collapsible trailer or the like in which the collapsing operation can be effected readily so as to reduce considerably the width of the vehicle and to enable the side and/or end wall members thereof to be stowed compactly within the collapsed ambit of the vehicle.

According to the present invention a trailer has its body constituted by a plurality of panels hinged together along parallel axes and including two normally vertical side panels and panels comprising the normally horizontal base whereby the body can be collapsed by folding the panels about said axes into substantially vertical planes so that the base panels are sandwiched between said side panels, strutting means connected across the side panels being disposed beneath said base to maintain the body in its normal condition and being collapsible with the said panels, a wheeled support for the body being connected to said strutting means.

Still further in accordance with the present invention the base of the trailer body or the like is constituted by a pair of panels hinged together along the longitudinal centre line of the trailer so that their lower faces can be brought together by pressing upwardly against the base in line with its centre line, a substantially X shaped strutting frame being disposed across the lower side of the base and with its intersecting arms connected together pivotally on an axis intersecting the longitudinal centre line of the base so that they can be brought together in substantial parallel relationship close to said longitudinal centre line, their outer ends and the corners of the base being pivotally and slidably connected together so that the folding of the base and of the X frame can be effected simultaneously, a wheeled support for the trailer body being connected to said strutting frame at the point of intersection.

For the wheeled support it is preferred to provide in alignment with the point of intersection of the arms of the frame a vertical axis journal bearing for a caster type of road wheel.

In order that the invention may be clearly understood and readily carried into effect drawings are appended hereto illustrating an embodiment thereof, and wherein, Figure 1 is a side elevation view showing the trailer coupled to the rear of a motor road vehicle.

Figure 4 is a detail sectional end elevation showing somewhat diagrammatically the relationship of the base and side wall members of the trailer body when collapsed.

Figure 5 is a detail broken perspective view showing the means for connecting the trailer to the motor road vehicle, and the manner of folding said means; and Figure 6 is a broken detail perspective view showing part of a side wall and an end wall or tail board and the manner of connecting the aforesaid foldable strutting frame thereto.

Figure 7 is a detail sectional elevation of the X frame.

Figure 1:
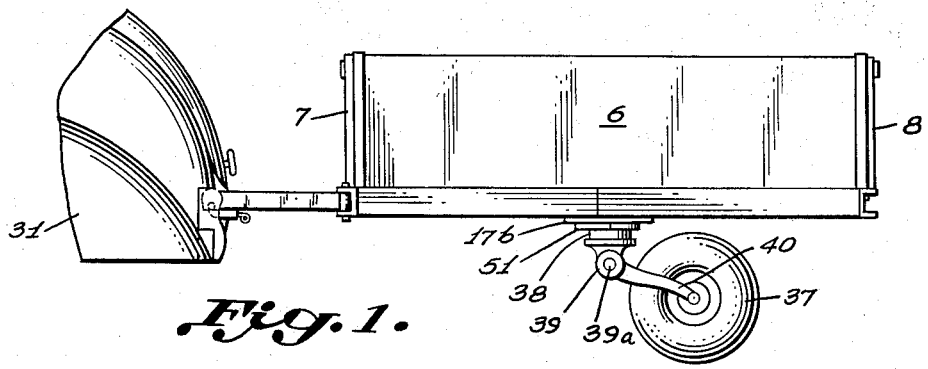
Figure 2:
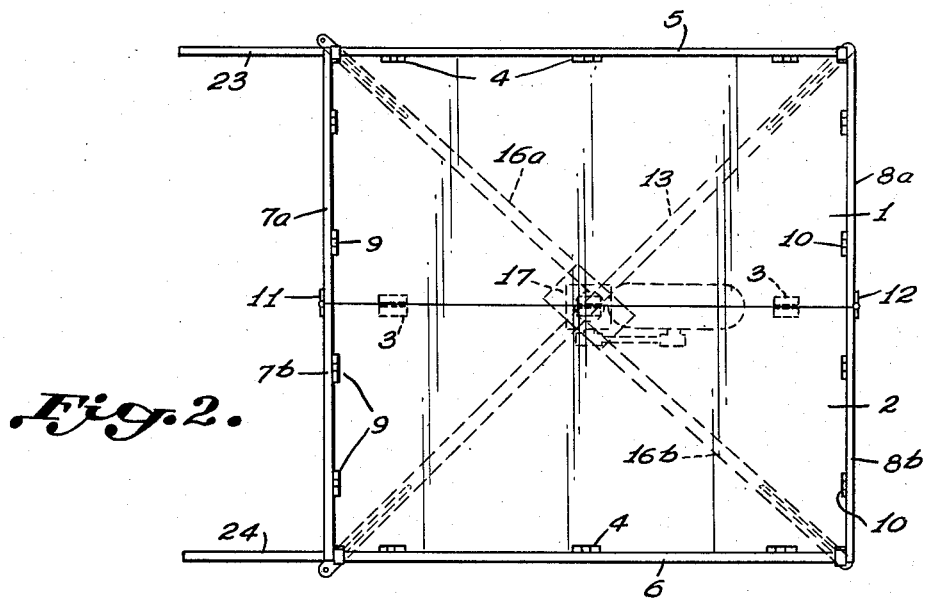
Figure 2 is a plan view of the trailer.
Figure 3:
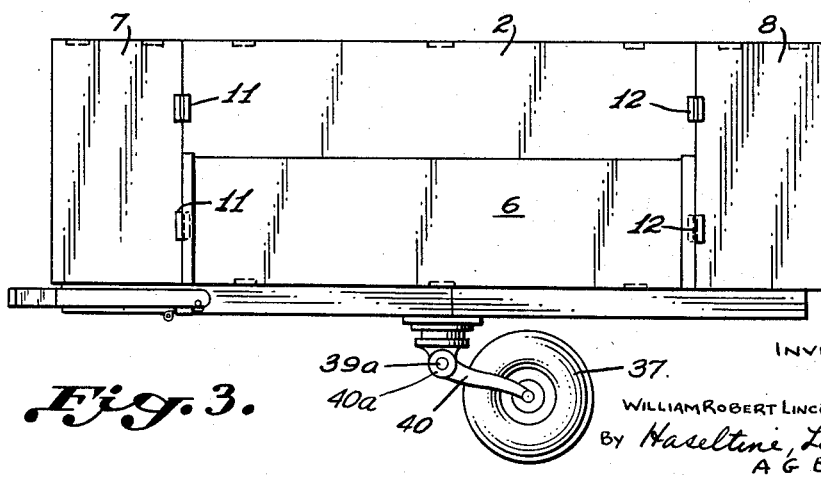
Figure 3 is a side elevation view showing the trailer collapsed.

Referring to the drawings, the trailer is adapted for ready connection to a convenient part of the rear of a motor road vehicle and comprises a rectangular, e. g. square base constituted by two wood, sheet metal or other suitable panels 1 and 2 with opposed parallel edges adapted to abut against each other but hingedly connected together by hinges 3 secured across their lower faces in such manner that the two panels can be folded towards each other by urging upwardly their opposed or hinged edges as shown in Figure 4. The two panels 1 and 2 comprising the base of the trailer have hinged to their outer longitudinal marginal edge parts by hinges 4 a pair of longitudinal side walls 5 and 6 which can be swung inwardly and downwardly against the panels so that when the trailer is collapsed the side walls and base panels lie close together.

Fore and aft end walls 7 and 8 can be provided each in the form of two panels 7a, 7b, and 8a, 8b hinged as at 9 and 10 respectively to the fore and aft ends of the base panels 1 and 2 and readily foldably secured to the fore and aft ends of the side panels 5 and 6, so that in order to collapse the trailer the fore and aft walls are disconnected from the side walls and brought co-planar with the base panels 1 and 2 whereupon the base panels with the co-planar end panels are folded upwardly about the axis of the hinges 3 and hinges 11 and 12 which connect together the opposed ends of the panels 7a, 7b and 8a, 8b respectively. After collapsing, the trailer can be stowed between or alongside the side walls. Alternatively, the fore and aft panels can be hingedly connected at their ends to the side panels and each constituted by a pair of panels hingedly connected along their vertical centre line. In a still further modification each fore and aft panel can be hingedly connected at one end only to the appropriate side wall panel and provided at its free end with suitable means for readily detachably anchoring it to the appropriate end of the other side panel.

The aforesaid collapsible body of the trailer is supported upon a substantially X shaped collapsible frame including a metal bar 13, preferably of channel section as shown, disposed diagonally across two corners of the base and slotted near its ends as at 14 (see Figure 5) to receive headed pins 15 depending from the fore and aft ends of the side panels 5 and 6, so that these pins 15 will slide along the appropriate slots 14 during collapsing and opening out of the body of the trailer.

Intersecting the aforesaid slotted bar is the other limb of the substantially X shaped frame and this is constituted by two separate channel section bars 16a, 16b each slightly offset from the true diagonal direction and fixedly secured at their inner ends to a common centre bracket or block 17, these two bars being parallel with each other and symmetrically disposed opposite sides of the centre of the base of the trailer, these bars as with the aforesaid single bar being formed with slots 14 at their outer ends to receive pins 15 connected to the corner parts of the base of the trailer.

The said headed pins 15 are welded to lower parts of four metal stiffening bars 18 (see Figure 6) which are cranked inwardly as at 18a over the upper and lower edges of the side panels 5 and 6, the inner limbs of the upper cranked parts 18a carrying slidable bolts 19 urged inwardly by springs inside sleeves 20 secured to the said upper cranked parts and formed with heads 21 which engage in holes 22 in the upper corners of the fore and aft hinged panels 7 and 8, the bolts being turned about their axes when engaged in the holes 22 to act as stops against the outer faces of the end panels.

To anchor the trailer body to a motor road vehicle the front ends of the bars 13 and 16a are prolonged slightly beyond their slotted parts and have pivoted thereto a pair of tie bars 23 and 24 by bolts 25 (see Figure 5) passed through bosses 26 on the outer ends of two bars 27 to which the inner or rear ends of the tie bars 23 and 24 are welded, the two bars 27 normally nesting along the channels of the bars 13 and 16a and being locked in position each by means of a lateral rearwardly projecting pin 28 thereon passing through a hole in the bar 13 (or 16b) and engaged by a spring loaded snap bolt 29 slidable in a sleeve 30 welded to the bar 13 (or 16b), the bolt having a head 29a for retracting it to free the bar 27. By this means the tow bars 24 can be swung alongside the bars 13 and 16b when the trailer has been uncoupled, so that the relatively shorter bars 27 project linearly beyond the bars 13 and 16b.

The tow bars 24 are coupled to the motor road vehicle 31 by engaging notches 32 in such bars over pins 33 spanning recesses 34 in the upper corners of bumper bar elements or "over-riders" 35 of the vehicle 31, and snap bolts 36 lock the tow bars to the pins 33.

The collapsible trailer is supported upon a caster type of road wheel 37, and for this purpose the aforesaid centre bracket or block 17 is formed with a flange 17a from which depends a boss forming a journal bearing structure 38 for a torsion type shock absorber 39 the centre pin 39a of which has secured to it the annular head 40a of the upper end of an arm 40 the lower end of which carries a unilateral stub axle on which is journalled the hub of the wheel 37, so that the road wheel will normally track in line with the centre line of the trailer.

Links, cables or chains are connected across the foldable end panels and the side panels to prevent the end panels from falling below the plane of the base of the trailer body.

Referring to Figure 7, the bar 13 is shown pivoted to a centre bolt 50 and the two bars 16a and 16b welded between two plates 17a and 17b, the lower one of which has bolted to it a centre ring 51 for a ball journal bearing 52 for the anchorage 39 for the wheel arm 40.

I claim:

1. In a collapsible trailer having a body constituted by a pair of co-planar horizontal base panels hinged together along a longitudinal axis by hinges permitting the upward folding inverted V fashion of the base, and a pair of upstanding side panels to which are hingedly connected the outer longitudinal edges of the base panels to the side panels so that the base panels will fold close against the side panels, a running gear comprising a foldable X frame located close against and in a plane parallel with the base panels of the body when the trailer is in use and foldable about the axis of intersection of its two arms, slots in the outer ends of the arms of the X frame, pins slidable in said slots and depending from the corners of the body in juxtaposition to the outer edges of the two base panels and the lower edges of the side panels, tow bars extending from the front ends of the said parts of the X frame for connection to the tractor vehicle, a caster road wheel supporting the trailer body and having its axis of articulation passing through the point of intersection of the X frame parts, said X frame comprising a bracket plate, a single bar comprising one of said arms and pivoted between its ends on a vertical axis to said bracket plate, and a pair of bars combining to form the other arm of the X frame and fixedly secured each at one end to said bracket plate and parallel with each other and staggered laterally and spaced linearly at such ends to permit said pivoted bar to fold close against their opposed longitudinal faces.

2. In a collapsible trailer having a body constituted by a pair of co-planar horizontal base panels hinged together along a longitudinal axis by hinges permitting the upward folding inverted V fashion of the base, a pair of upstanding side panels, and hinges connecting the outer longitudinal edges of the base panels to the side panels so that the base panels will fold close against the side panels, a running gear comprising a foldable X frame located close to the base of the body and disposed diagonally of the said base when the trailer is opened for use and foldable about the axis of intersection of its parts, slots in the outer ends of the arms of the X frame, pins depending from the side panels adjacent to the corners of the body and slidable in said slots, tow bars extending from the front ends of the said parts of the X frame for connection to the tractor vehicle, and a caster road wheel having its axis of articulation passing through the point of intersection of the X frame parts, each said tow bar comprising a main bar fixedly united wide V fashion to a lateral bar normally abutted against the appropriate part of said X frame, a hinge connecting the said lateral bar to the front end of said part of the X frame, and means readily releasably securing said lateral bar to said part of the X frame.

3. In a collapsible trailer having a body constituted by a pair of co-planar horizontal base panels hinged together along a longitudinal axis by hinges permitting the upward folding inverted V fashion of the base, a pair of upstanding side panels, hinges connecting the outer longitudinal edges of the base panels to the side panels so that the base panels will fold close against the side panels, a running gear comprising a foldable X frame disposed close against the base panels of the body and foldable about the axis of intersection of its two arms, a bracket at the said axis of intersection and to opposite sides of which are secured fixedly the inner ends of two bars comprising effectively one of the arms of the X frame, another single bar passing through the said bracket and forming the other arm of the X frame, slots in the outer ends of said arms of the X frame, pins depending from the corners of the body and slidable in said slots, tow bar means extending from the front end of the X frame for connection to the tractor vehicle, and a caster road wheel having its axis of articulation passing through the point of intersection of the X frame parts.

References Cited in the file of this patent

UNITED STATES PATENTS

| Number | Name | Date |
|---|---|---|
| 314,328 | Gerbracht et al. | Mar. 24, 1885 |
| 611,675 | Brookmeyer | Oct. 4, 1898 |
| 1,471,479 | Gleissner | Oct. 23, 1923 |
| 1,637,129 | Pritchett | July 26, 1927 |
| 2,471,462 | Toth | May 31, 1949 |
| 2,509,794 | Anderson | May 30, 1950 |
| 2,558,153 | Peterson | June 26, 1951 |

FOREIGN PATENTS

| Number | Country | Date |
|---|---|---|
| 567,081 | Great Britain | Jan. 26, 1945 |
| 876,437 | France | Aug. 3, 1942 |